United States Patent [19]
Scott

[11] 4,112,831
[45] Sep. 12, 1978

[54] COFFEE BLENDERS

[76] Inventor: Herman B. Scott, 7 S. Pennsylvania, Oklahoma City, Okla. 73107

[21] Appl. No.: 787,544

[22] Filed: Apr. 14, 1977

[51] Int. Cl.² ............................................. A47J 31/00
[52] U.S. Cl. ...................................................... 99/306
[58] Field of Search ................ 99/306, 305, 300, 301, 99/295, 304

[56] References Cited
U.S. PATENT DOCUMENTS

| | | | |
|---|---|---|---|
| 1,108,288 | 8/1914 | Watson | 99/304 |
| 1,456,010 | 5/1923 | Richheimer | 99/306 |
| 1,876,474 | 9/1932 | Starkey | 99/295 |
| 3,561,349 | 2/1971 | Endo | 99/295 |
| 3,952,642 | 4/1976 | Vitous | 99/300 |

Primary Examiner—Edward J. McCarthy
Attorney, Agent, or Firm—Robert M. Hessin

[57] ABSTRACT

A device for use in conjunction with conventional coffee makers of the drip blending variety. The novel device consists of a disc or plate constructed of suitably heat resistant material and adapted to be disposed in the bottom of the filter holder during the process of coffee blending.

3 Claims, 4 Drawing Figures

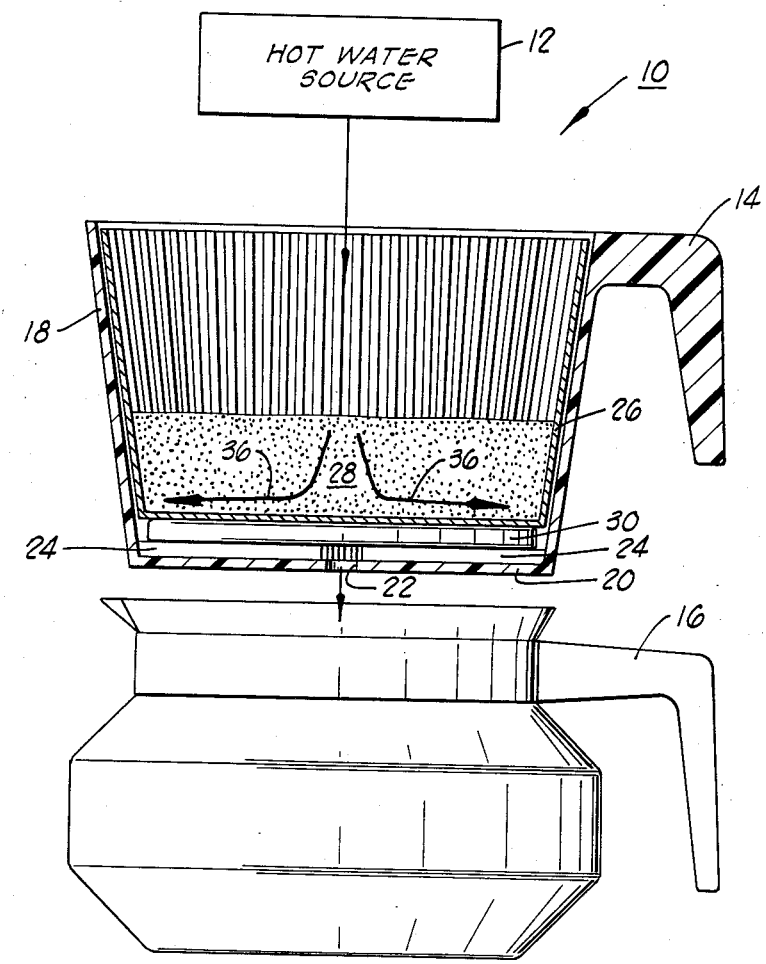
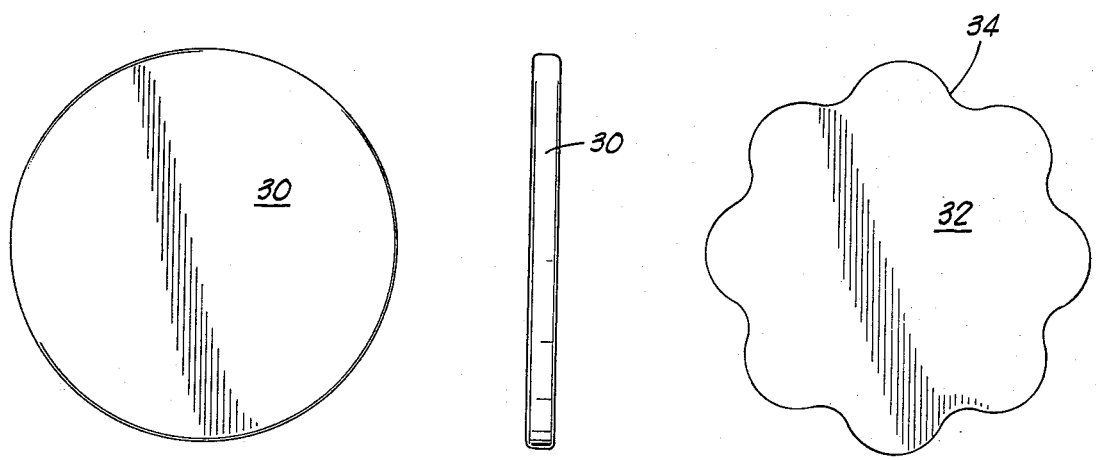

COFFEE BLENDERS

BACKGROUND OF THE INVENTION

1. Field of the Invention

The present invention relates to improvements in coffee blending apparatus which consists of an additional component for use in combination therewith.

2. Description of the Prior Art

A search of the prior art discloses no similar types of device which are intended for use in combination with existing forms of coffee maker.

SUMMARY OF THE INVENTION

The present invention relates to a device for use in combination with existing drip-type coffee makers, the device consisting of a disc member of solid and relatively heat-resistant consistency which is placed by insertion in the bottom of the filter holder to cause optimum flow of hot water therethrough during blending.

Therefore, it is an object of the invention to provide a combinative device for use with drip blending coffee makers that improves the flavor of the blended product.

It is also an object of the present invention to provide such a device for use in combination which enables usage of a lesser amount of dry coffee grounds to render a satisfactory tasteful brewed product.

Finally, it is an object of the present invention to provide a device for use in combination with any of various forms of drip blending coffee makers to achieve greater efficiency and economy of product.

Other objects and advantages of the present invention will be evident from the following detailed description when read in conjunction with the accompanying drawing which illustrates the invention.

BRIEF DESCRIPTION OF THE DRAWING

FIG. 1 is a side elevation with parts shown in section of a typical drip blending coffee maker which includes the present invention;

FIG. 2 is a plan view of the present invention;

FIG. 3 is a side view of the present invention; and

FIG. 4 is a plan view of an alternative form of the invention.

DETAILED DESCRIPTION OF THE INVENTION

FIG. 1 illustrates a typical form of drip blending coffee maker of the type which presently enjoys wide commercial usage. The coffee maker 10 consists of the old and well-known components of a drip coffee blender in that it requires a hot water source 12, an intermediate dry ground coffee holder 14, and a heating pot 16. Such coffee makers are presently employed in various office and business enterprises, and the similar forms of units are available for sale and usage in the home.

The coffee holder 14 consists of a receptacle portion 18, usually formed from a suitable plastic, having a generally flat bottom panel 20 with a central hole 22 allowing passage of the brewed coffee into the pot 16. Many types of coffee holder 14 include such as radially aligned flutings 24, or similar spacing members, integrally formed as by molding with the bottom panel 20. A standard form of filter paper, also of generally fluted configuration to give greater filter area, is then inserted within the receptacle 18 of holder 14 and the dry ground coffee 28 is held therein for the brewing process.

The present invention consists of a disc 30 of nominal thickness but diameter slightly less than the inside area of bottom panel 20 of holder 14. The disc 30 may be constructed of suitable heat-resistant plastic, Pyrex glass or the like and it is merely placed on the inside surface of the lower panel 20, or any flutings 24 or other contiguous surfaces extending upwardly therefrom.

FIGS. 2 and 3 illustrate the simple form of disc 30 and it should be understood that the thickness is not of particular criticality since flow directivity will still be achieved. It is highly probable that a relatively thin disc 30 is desirable since it would result in less heat absorption from the hot water brew passing therearound. FIG. 4 illustrates an alternative form of disc 32 having an undulating or fluted circumferential edge 34. Such design as that of disc 32 may be desirable in exacting better fit within certain forms of coffee maker holder 14 as are commercially available. Still other forms of disc such as a generally square shape are well within contemplation of the present invention such that the disc can function with coffee maker holders requiring a particular shape.

In operation, the coffee maker 10 is used in the normal manner except that disc 30 is inserted in the bottom of receptacle 18 with filter paper 26 inserted thereafter to contain a lesser amount of ground coffee 28 than would normally be required for a similar tasty brew. Individual users will of course have to adjust the amount of dry coffee 28 in accordance with their taste requirements and observances. Thereafter, the requisite amount of hot water from hot water source 12 is introduced into filter 26 onto coffee grounds 28. The disc 30 then causes a radial flow action as generally indicated by lines 36. The radial flow acton results in unit portions of hot water contacting more ground coffee particles and remaining in contact with ground coffee particles for a greater duration prior to release through receptacle hole 22 into coffee pot 16. By utilizing disc 30, there can be no pockets of unwetted coffee grounds as sometimes appear around the outer circumfery of the lower end of filter 26. Due to the improved efficiency of hot water coursing through the ground particles, a lesser amount of ground particles is required in order to achieve a similar tasting product.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A device for use in combination with a drip coffee blender of the type where heated water is released through a holder containing filter paper and dry coffee grounds for blending and final release of brewed coffed into a holding pot, the improvement device comprising:

a disc member generally shaped to the same size and configuration as the bottom panel area of said filter paper and being disposed between the bottom of said filter paper and the bottom of said holder receptacle, said disc member being formed from solid material to be relatively thin as compared to the diameter whereby water released through said holder is diverted radially before final release of the brewed coffee.

2. The improvement device as set forth in claim 1 which is further characterized in that:

said disc member is formed with a fluted edge of similar regular configuration therearound.

3. The improvement device as set forth in claim 1 which is further characterized in that:

said disc member is formed of glass of approximately one-eighth inch thickness.

* * * * *